United States Patent
Kikin et al.

(10) Patent No.: US 7,398,926 B1
(45) Date of Patent: Jul. 15, 2008

(54) APPARATUS AND METHOD FOR PROGRAMMING AN RFID TRANSPONDER USING A CONSTRAINED FIELD

(75) Inventors: Vadim Kikin, Spring Valley, NY (US); Donny V. Lee, Northport, NY (US)

(73) Assignee: Applied Wireless Identifications Group, Inc., Monsey, NY (US)

( * ) Notice: Subject to any disclaimer, the term of this patent is extended or adjusted under 35 U.S.C. 154(b) by 681 days.

(21) Appl. No.: 10/678,172

(22) Filed: Oct. 6, 2003

(51) Int. Cl.
| | |
|---|---|
| G06K 7/08 | (2006.01) |
| G06K 19/06 | (2006.01) |
| G06K 7/01 | (2006.01) |
| H04Q 5/22 | (2006.01) |
| G08B 13/14 | (2006.01) |

(52) U.S. Cl. .............. 235/451; 235/382.5; 235/492; 235/493; 340/572.7; 340/10.51

(58) Field of Classification Search .......... 340/572.1, 340/10.1, 10.51, 572.7; 235/451, 382.5, 235/492, 493
See application file for complete search history.

(56) References Cited

U.S. PATENT DOCUMENTS

| | | | | |
|---|---|---|---|---|
| 5,995,048 | A * | 11/1999 | Smithgall et al. ..... 343/700 MS |
| 6,848,616 | B2 * | 2/2005 | Tsirline et al. .............. 235/449 |
| 6,899,476 | B1 * | 5/2005 | Barrus et al. ................... 400/76 |
| 7,066,667 | B2 * | 6/2006 | Chapman et al. .............. 400/76 |
| 7,190,270 | B2 * | 3/2007 | Brown et al. ............. 340/572.1 |
| 2002/0011967 | A1 * | 1/2002 | Goff et al. .................... 343/895 |
| 2002/0067267 | A1 * | 6/2002 | Kirkham ................... 340/572.7 |
| 2002/0097153 | A1 * | 7/2002 | Youbok et al. ........... 340/572.5 |
| 2004/0160233 | A1 * | 8/2004 | Forster ........................ 324/667 |
| 2005/0045723 | A1 * | 3/2005 | Tsirline et al. .............. 235/451 |
| 2005/0045724 | A1 * | 3/2005 | Tsirline et al. .............. 235/451 |
| 2005/0058483 | A1 * | 3/2005 | Chapman et al. .............. 400/76 |
| 2005/0139667 | A1 * | 6/2005 | Barrus et al. ................. 235/432 |
| 2005/0206524 | A1 * | 9/2005 | Forster et al. ............ 340/572.8 |
| 2005/0223286 | A1 * | 10/2005 | Forster ........................ 714/25 |
| 2005/0252968 | A1 * | 11/2005 | Tsujimura et al. ........... 235/439 |
| 2005/0274799 | A1 * | 12/2005 | Torchalski et al. .......... 235/432 |
| 2005/0276647 | A1 * | 12/2005 | Chapman et al. .............. 400/62 |
| 2005/0280537 | A1 * | 12/2005 | Feltz et al. ................ 340/572.1 |
| 2006/0023575 | A1 * | 2/2006 | Hayashi et al. ........... 369/30.37 |
| 2006/0109496 | A1 * | 5/2006 | Brown et al. ................. 358/1.15 |
| 2006/0127154 | A1 * | 6/2006 | Barrus et al. ................... 400/76 |
| 2006/0208895 | A1 * | 9/2006 | Chiu ........................ 340/572.7 |
| 2006/0208897 | A1 * | 9/2006 | Chiu et al. ............... 340/572.7 |
| 2006/0220859 | A1 * | 10/2006 | Nagai et al. .............. 340/572.1 |
| 2006/0232411 | A1 * | 10/2006 | Torchalski et al. ........ 340/572.1 |
| 2007/0023516 | A1 * | 2/2007 | Chapman et al. ............ 235/432 |
| 2007/0040680 | A1 * | 2/2007 | Chiu ........................ 340/572.1 |

(Continued)

*Primary Examiner*—Daniel I Walsh
(74) *Attorney, Agent, or Firm*—Mark Levy; Hinman, Howard & Kattell

(57) ABSTRACT

An RFID transponder programming device uses a strip transmission line to generate a constrained electromagnetic field for programming RFID transponders is featured. The programmer minimizes electromagnetic fields outside of the programming device, and keeps other blank transponders from being wrongly programmed or erased. The transmission line may either be terminated or unterminated. The characteristic impedance of the strip transmission line may be 50 ohms or any other impedance. Since the strip transmission line is terminated in its own characteristic impedance, the programmer is inherently wideband and able to work with frequencies from 433 MHz to 869 MHz, 902 to 928 MHz, and 2400 to 2485 MHz, all in the same unit.

12 Claims, 8 Drawing Sheets

U.S. PATENT DOCUMENTS

| | | | |
|---|---|---|---|
| 2007/0040689 A1* | 2/2007 | Reynolds | 340/572.7 |
| 2007/0063843 A1* | 3/2007 | Tsirline et al. | 340/572.1 |
| 2007/0099566 A1* | 5/2007 | Borisov et al. | 455/41.1 |
| 2007/0120670 A1* | 5/2007 | Torchalski | 340/572.1 |
| 2007/0176781 A1* | 8/2007 | Brown et al. | 340/572.1 |
| 2007/0200710 A1* | 8/2007 | Feltz et al. | 340/572.7 |
| 2007/0268143 A1* | 11/2007 | Copeland et al. | 340/572.7 |

* cited by examiner

APPARATUS AND METHOD FOR PROGRAMMING AN RFID TRANSPONDER USING A CONSTRAINED FIELD

FIELD OF THE INVENTION

This invention pertains to the field of RFID transponders and, more particularly, to a programming device for RFID transponders utilizing a constrained field to enhance field strength during a programming operation.

BACKGROUND OF THE INVENTION

Radio Frequency Identification (RFID) technology is fast becoming a part of our daily lives. These diverse devices and systems such as car immobilizers, access control systems, toll collection systems, global item tracking systems, and supply chain management rely more and more on RFID technology. RFID technology has been widely lauded for its potential to provide an unprecedented level of product traceability across the supply chain. RFID-enabled systems have the capability to greatly reduce human error from the data collection process. This error reduction, in turn, helps reduce inventories, improve product availability, identify and reduce loss and waste, and help ensure safety and security. All of these factors contribute to lower product cost and greater availability to consumers.

RFID transponders are typically manufactured and supplied in large quantities, often packaged in rolls ranging from 3 to 9 inches in diameter. Regardless of an RFID transponder's ultimate use or application, each must be converted from a blank transponder to one that carries an electronic ID code (i.e., is programmed). In the case of read-only transponders, a link between the transponder's internal ID code and the identity of the item that it is attached must recorded. Typically, this information is entered at the moment the transponder is peeled from the roll and attached to an item. This process is called data linking. Programming or data linking is typically performed before applying the transponders to items or shipping containers, etc. In the case of shipping labels, a shipper's address, the destination, and a routing number are often printed on a 4×6 inch label attached to an item (e.g., a package) over the transponders.

To work with the existing infrastructure of bar code scanners, the top side of each RFID-enabled shipping label must also be printed with both a bar code and human readable text to ensure compatibility with non-RFID enabled environments. Therefore, each of the many read-write or read-only transponders must be individually printed with a bar code representing a description of content, a shipping destination, etc. and then dispensed for attachment.

Typically, the blank transponders are supplied in either rolls or fan-fold stacks ready for printing. Since many blank transponders are packed in a limited space, an RFID reader/programmer must use a programming device that creates and projects a well-defined RF field. A well-defined field ensures that only a designated transponder is read and/or programmed while adjacent blank transponders are ignored. It is of particular importance that a neighboring transponder, which has already been programmed, not be erased or otherwise altered.

RFID transponders, especially those used at UHF frequencies, are specifically designed for a particular mounting surface. A transponder antenna designed for such UHF transponders must therefore be adjusted or tuned to ensure optimum performance when the transponder is mounted on its intended surface. A transponder that is designed or tuned for mounting on paper, for example, will have drastically reduced performance in free space conditions.

Depending on the specific design, when a transponder designed for paper mounting is unrolled and placed in free space and in preparation for reading/programming/printing, it can lose as much as 70% of its designed read range. The adjacent transponder(s) still on the paper roll, however, may retain full sensitivity. This degradation in read range between free space and paper, along with difficulty in controlling a programmer's antenna's read zone, accounts for some of the known reading/programming problems that must be reliably resolved.

When programming a transponder designed for paper mounting in free space, as is the case with most label printers, the programmer's field strength must be strong enough to compensate for the 70% degradation from paper to free space. Potential problems exist because other transponders still on the roll will typically have full sensitivity and may be within inches of the programming device. If the field strength outside the programming device is not controlled properly, the transponders still on the roll may receive sufficient signal strength to respond to a programming command that is intended for a free space transponder.

All programming commands are typically followed by a lock command. There is a need, therefore, for a transponder reading/programming device that is able to generate sufficient signal strength within a predefined space and maintain at least 20 to 30 dB of signal attenuation outside of that space. Such a device should ensure that only the designated tag receives a write command with sufficient strength for the transponder to act upon the command. When a programming device is properly designed, the chances for false programming can be minimized.

Tagging items with bar code labels and affixing boxes or containers with bar code shipping labels are standard business practices. Many companies who regularly use parcel service typically install a dedicated shipping software package, typically provided by the shipping carrier, and a bar code printer that prints on industry standard 4×6 inch stick-on thermal printing labels. While different carriers usually require different data formats or details, they universally require the originator's ID, a ship-to address, routing information, billing information, and tracking numbers. Bar codes alone may be adequate if one is willing to physically scan each and every package.

When the label becomes smeared with dirt, is damaged, faces the wrong direction, or is blocked by another piece of paper, the bar code alone becomes inadequate. When searching for a specific label within a pile of packages, the shortcomings of a bar code only system become blatantly obvious. In such situations, an RFID-based system provides a better solution than a bar code only system. For example, it is known that a package moving through the UPS™ system is scanned by a bar code scanner an average of 47 times between package acceptance and final package delivery. This means that a stationary or a handheld scanner must get close to the package and scan the package 47 times. On the other hand, an RFID-enabled system has the capability to greatly reduce human error in data collection, reduce inventory errors, improve product availability, identify and reduce loss and waste, and help ensure safety and security.

An industry trend is to migrate from a bar code only system to a system combining bar coded labels and RFID transponders. These systems retain the bar coded labels for circumstances when a human must visually inspect a shipping label to read the routing information, tracking numbers, and shipping destination. Therefore, the best migration path seems to be to laminate a thin RFID label behind the bar code label, and equip a standard bar code printer to simultaneously print the label and program the RFID label.

When installing an RFID reader/programmer capability in a standard bar code printer, one approach is to place a low gain antenna just before the bar code printing head. There are a few problems typically encountered when using this approach. First, there are usually many metal parts within the printer, which cause undesirable reflections and severe impedance mismatches—peaks and nulls in electromagnetic fields within the printer chassis. Because the RFID transponder programming device must utilize frequency hopping, peaks and nulls occur as the programmer hops from one frequency channel to another frequency channel. These peaks and nulls in the electromagnetic field are generally unpredictable. A second problem is that the antenna may read transponders that are placed far from the intended transponders when the antenna's field of surveillance becomes unpredictable.

A further complication is the fact that the industry's leading protocol is designed without any transponder personal identification numbers (PINs). This means in the blank mode, all transponders are identical. The programming device, therefore, loses its ability to confine its command to any specific set of transponders. The lack of a PIN means that when writing information to the transponder, any transponder exposed to minimum field strength will automatically respond to that programming command. There is no selection command to command that only a designated transponder will respond.

Since all commands will be received by all available transponders, it is the programmer's duty to ensure that only the designated transponder can receive an intended command and only the designated transponder should respond to such a command. In cases where two transponders are simultaneously within the reader's field of view, a write command may cause both transponders to accept the same write command, the same data, and the same lock command. Therefore, the possibility of having multiple transponders accept the same command and lock the same command is a real danger in a label printer designed to provide RFID transponder programmer.

SUMMARY OF THE INVENTION

In accordance with the present invention there is provided an RFID transponder-programming device that is able to generate a well-defined electromagnetic field to program a transponder without activating any adjacent transponders. This device is wideband and is capable of generating sustainable field strength strong enough to energize (i.e., read and write to) the RFID transponder. The inventive programmer sends a command to a particular transponder, reads the data from that transponder, and finally writes to the transponder.

RFID transponders may be passive transponders that consist of an antenna and an RFID application specific integrated circuit (ASIC). A passive transponder does not have its own energy source such as a battery. Rather, passive transponders rely on the energy from the electromagnetic field of the interrogator or the programmer for energy. The inventive transponder-programming device is basically a terminated strip transmission line transmission line, which can be a straight transmission line, a folded transmission line, or a meandered transmission line.

A strip transmission line design is basically a thin conductor sandwiched between two large ground planes. The dielectric material between the two ground planes can be air, vacuum, or any other non-conductive (i.e., dielectric) material. The spacing between the thin conductor and the ground planes and the dielectric constant of the insulating material determines the characteristic impedance of the strip transmission line. The specifics of the design of the inventive programming device are dependent on the size of the transponders being programmed, the transponder operating frequency, and the speed at which the transponder travels through the programming device.

It is therefore an object of the invention to provide a constrained field reader/programmer for RFID transponders.

It is another object of the invention to provide a constrained field reader/programmer for RFID transponders, which may be combined with a label printer.

It is an additional object of the invention to provide a constrained field reader/programmer for RFID transponders that may accurately program a single predetermined RFID transponder without affecting any neighboring RFID transponders by wrongfully programming, erasing, or otherwise modifying the memory contents thereof.

It is a further object of the invention to provide a constrained field reader/programmer for RFID transponders, which effectively operates with families of RFID transponders that do not utilize a selective programming technique such as a PIN.

It is yet another object of the invention to provide a constrained field reader/programmer for RFID transponders utilizing a slot for easily inserting a web of blank RFID transponders into the programmer.

It is a still further object of the invention to provide a constrained field reader/programmer for RFID transponders that may accommodate RFID transponders of different sizes.

It is an additional object of the invention to provide a constrained field reader/programmer for RFID transponders selectively utilizing different known frequency bands of approximately 433 MHz to 2485 MHz.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Figure 1:
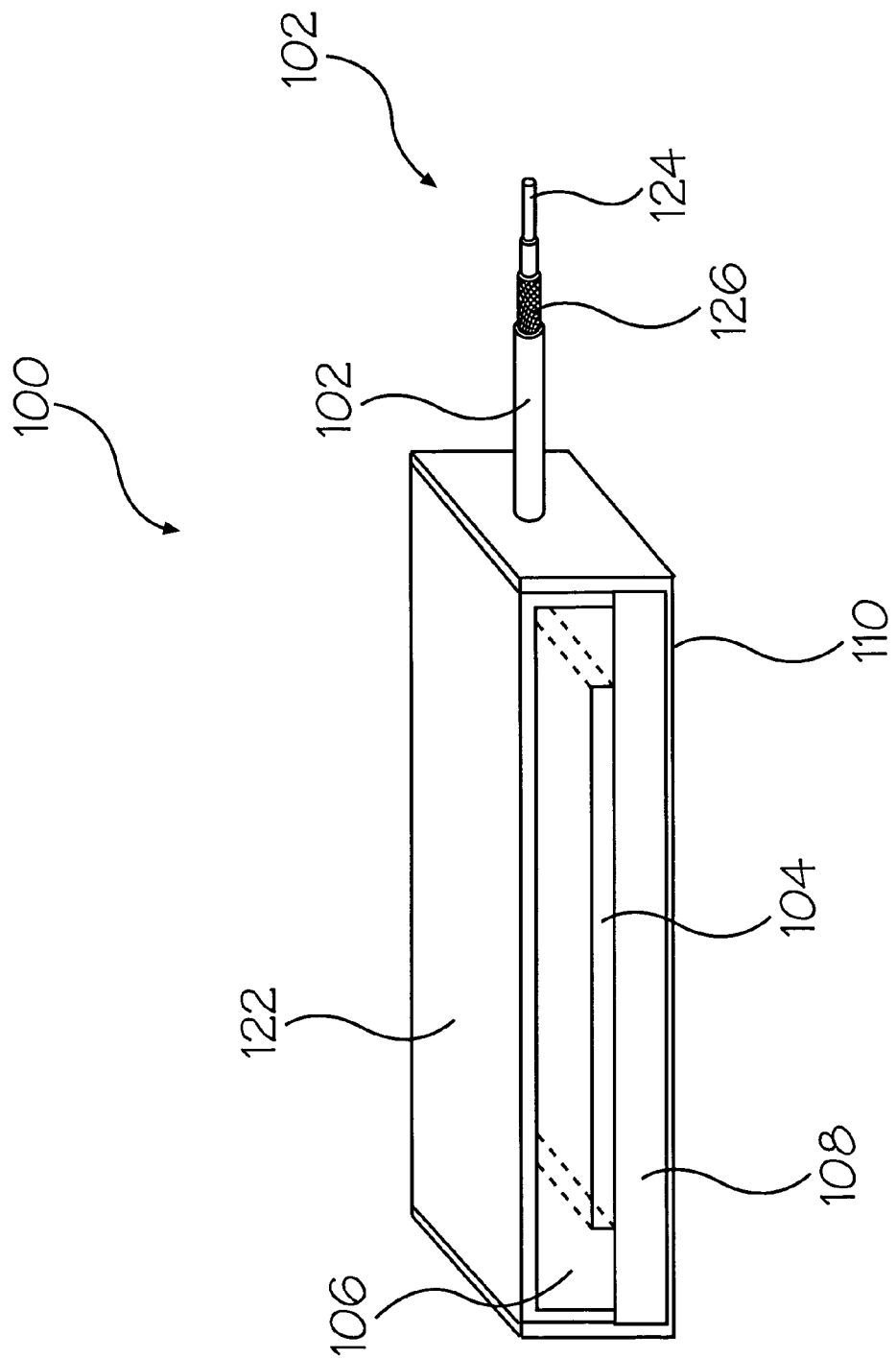
FIG. 1 is a perspective view of a first embodiment of the RFID transponder programmer.

Referring first to FIG. 1, there is shown a perspective view of a first embodiment of the RFID transponder programmer 100, hereinafter referred to as programmer, of the present invention. The programmer 100 is housed in a conductive housing 122, preferably made of metal or a conductive or coated polymer. A coaxial cable 102 is attached to the programmer 100 and is used to receive radio frequency programming commands and output the backscattered radio frequency signals from the transponders (not shown). It will be recognized that a connector (not shown) could be provided in alternate embodiments to allow removable attachment of an external cable (not shown) to the programmer 100.

Two layers of dielectric material, upper dielectric material 106 and lower dielectric material 108, are disposed adjacent one another with an air gap slot 104 disposed therebetween. The air gap slot 104 forms a rectangular channel completely extending through the programmer 100 (i.e., from side to side). It will be recognized that the air gap slot 104 may be disposed either above or below the central conductor 116 (FIG. 2).

A metallic shield 110 is disposed beneath the lower dielectric material 108. In operation, the conductive housing 122, metallic shield 110, lower dielectric material 108, and upper dielectric material 106 form a portion of a strip transmission line. The physical distance between the strip transmission line central conductor 116 (FIG. 2) and its ground planes (e.g., the conductive housing 122 and metallic shield 110) is determined by a desired value of the characteristic impedance and the dielectric constant of the selected upper and lower dielectric materials 106, 108. For programming, RFID transponders (not shown) are passed through the air gap slot 104 of the programmer 100. The direction of a transponder's travel through the programmer 100 is immaterial.

Figure 2:
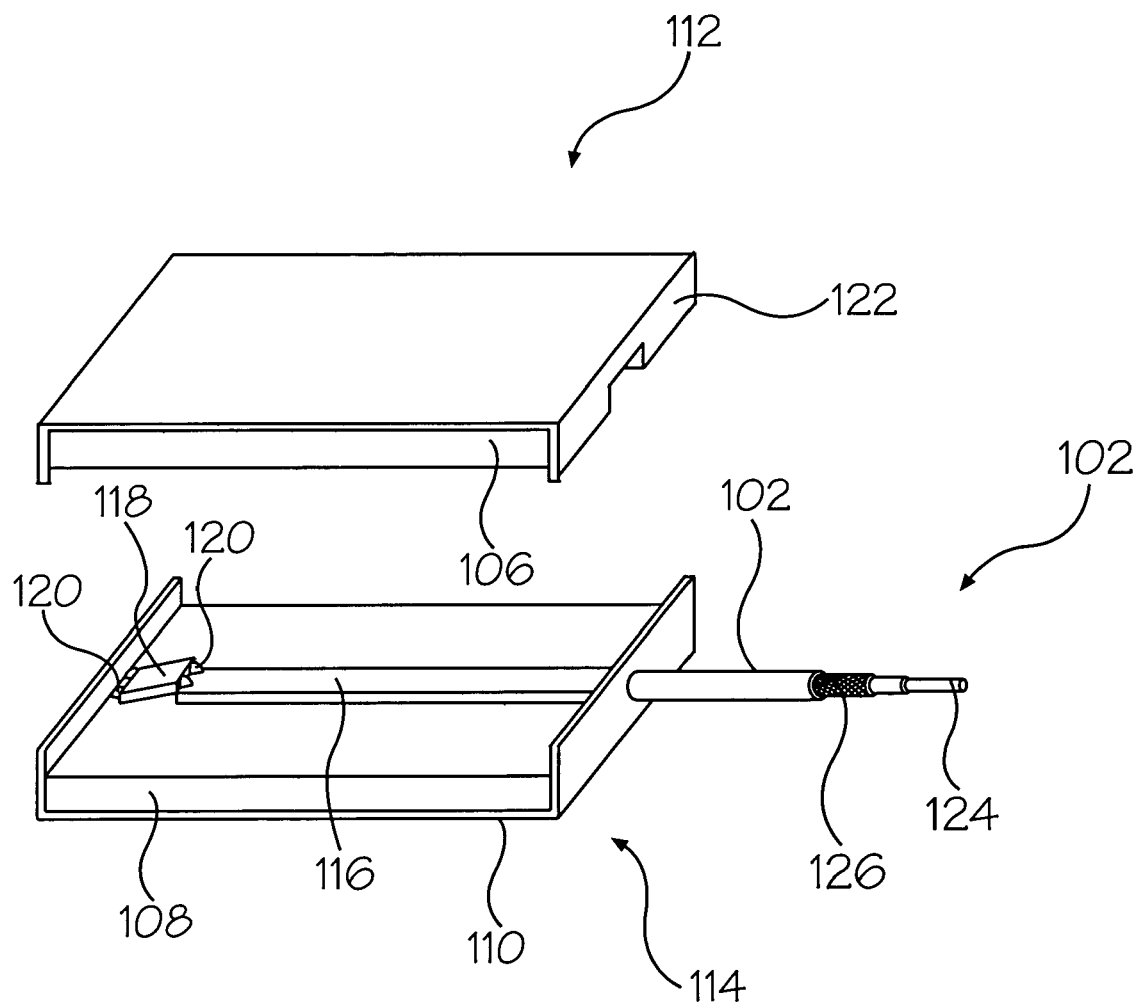
FIG. 2 is an exploded perspective view of the programmer of FIG. 1.

Referring now to FIG. 2, there is shown an exploded, perspective view of the programmer 100 of FIG. 1. As may be seen, the programmer 100 comprises a top portion 112 and a bottom portion 114. A central conductor 116 of a strip transmission line is connected to a center conductor 124 of coaxial cable 102. The shield 126 of coaxial cable 102 is electrically connected to the ground plane, typically formed by metallic housing 110. Optional terminating impedance 118 is connected between the central conductor 116 and the ground planes, typically by solder connections 120. It will be recognized that the transmission line may be terminated or unterminated. If terminated, the termination impedance may either match or mismatch the characteristic impedance of the transmission line. When used, the terminating impedance 118 is selected to control field strength of the RF field surrounding the central conductor 116 of the transmission line.

In operation, the upper portion 112 and lower portion 114 are clamped or otherwise securely retained against one another to form the configuration of the programmer 100 shown in FIG. 1. When so positioned, a strip transmission line is effectively formed between the upper portion 112 and lower portion 114. The upper portion 112 and lower portion 114 form ground planes, which, together with central conductor 116 and upper and lower dielectrics 106 and 108, form the strip transmission line. When the upper portion 112 is removed, the remaining structure in the lower portion 114 is a Microstrip transmission line.

Only when the upper portion 112 is physically positioned adjacent the lower portion 114 is a strip transmission line formed. It should be noted that the ground planes formed by the upper portion 112 and lower portion 114 should be electrically connected to form an overall ground plane for the programmer 100. The strip transmission line can take on many different forms such as linear, U-shaped, meandering, or any combination of these or other shapes known to those of skill in the RF transmission line art. Typically, the characteristic impedance of the transmission line may be 50 ohms, but other characteristic impedances may be chosen to meet a particular operating circumstance or environment.

It will be recognized that the use of a terminated transmission line will provide the widest possible operating frequency range for the inventive programmers. The optimum frequency range will be obtained when the transmission line is terminated with its own characteristic impedance. Several different operating frequency bands are known in the RFID art. Typical, approximate operating frequencies are 433 MHz, 869 MHz, in the range of 902-928 MHz, and in the range of 2400-2485 MHz. The inventive programmers are designed to handle any or all of these frequency ranges within a single unit.

Figure 3A:
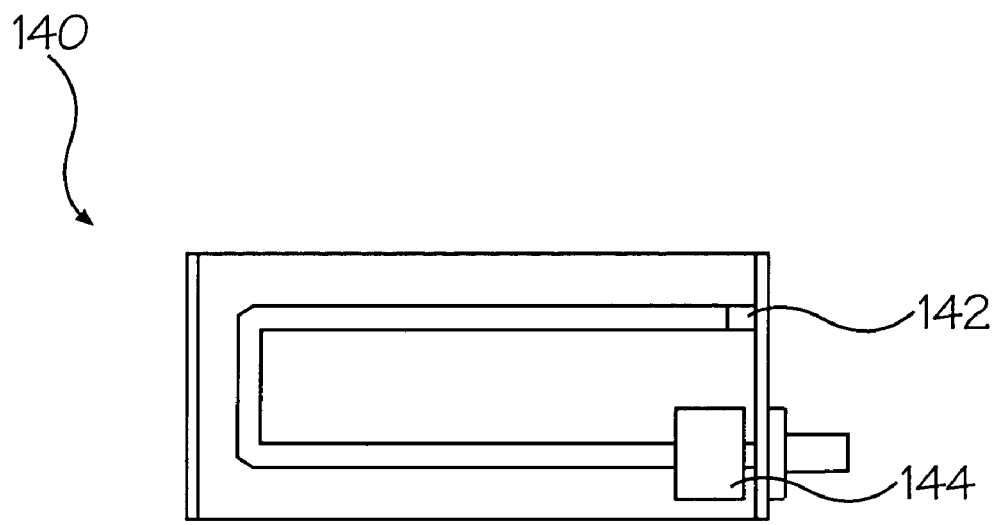
FIG. 3a is a top plan view of a U-shaped strip transmission line.
Figure 3B:
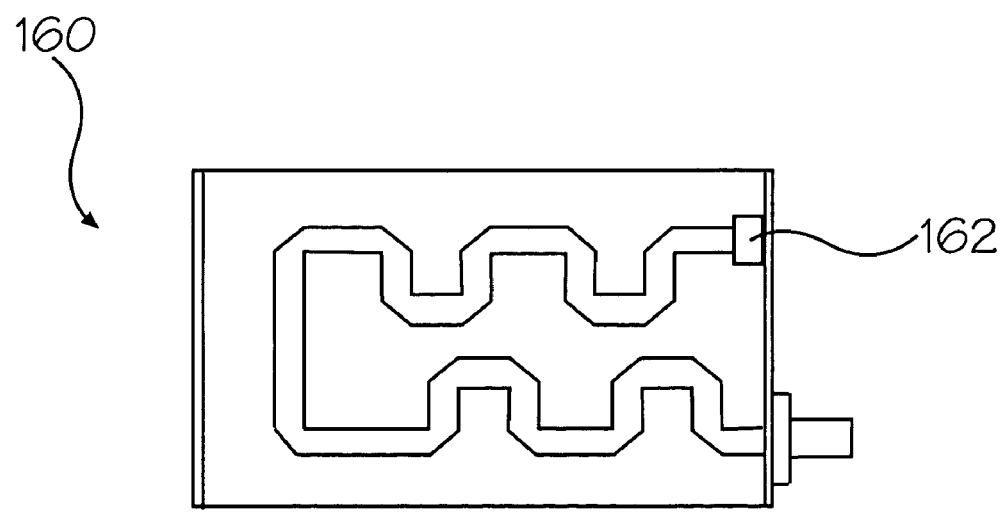
FIG. 3b is a top plan view of a meandering strip transmission line.

Referring now to FIGS. 3a and 3b, top plan views of lower portions of two alternate embodiments of the programmer 100 (FIG. 1) are shown, generally at reference nos. 140 and 160, respectively. FIG. 3a shows a U-shaped strip transmission line. This design has the advantage of accepting wider RFID transponders, not shown, than programmer 100. This design is also useful when RFID transponders, not shown, must pass through the programmer 140 at high speed while maintaining a fixed minimum programming time. When the RFID transponders have to travel at a still higher speed through the programmer, or the 160 RFID transponder width must be further increased, the embodiment of FIG. 3b provides even greater improvement. FIG. 3b shows a meander line design, which allows wider RFID transponders and/or even faster transit for the devices. The meander design 160 will allow the use of very narrow RFID transponders traveling through the programmer 160 at a relatively higher speed. Each programmer 140, 160 has a terminating impedance, typically terminating resistors 142 and 162 respectively.

An optional impedance transformer 144 is shown in programmer 140. The impedance transformer 144 can step the impedance up or down, depending on design requirements. Translating the impedance to a higher level allows for programming larger RFID transponders that require higher field strengths and the devices are typically less influenced by the closeness of the transponder to the programmer. On the other hand, stepping down the impedance allows programming smaller, thinner transponders that are typically less influenced by signal level variations. Because blank RFID transponders are typically packaged in rolls, the programmer 100 (FIG. 1) requires threading the lead transponder through the air gap slot 104.

Figure 4:
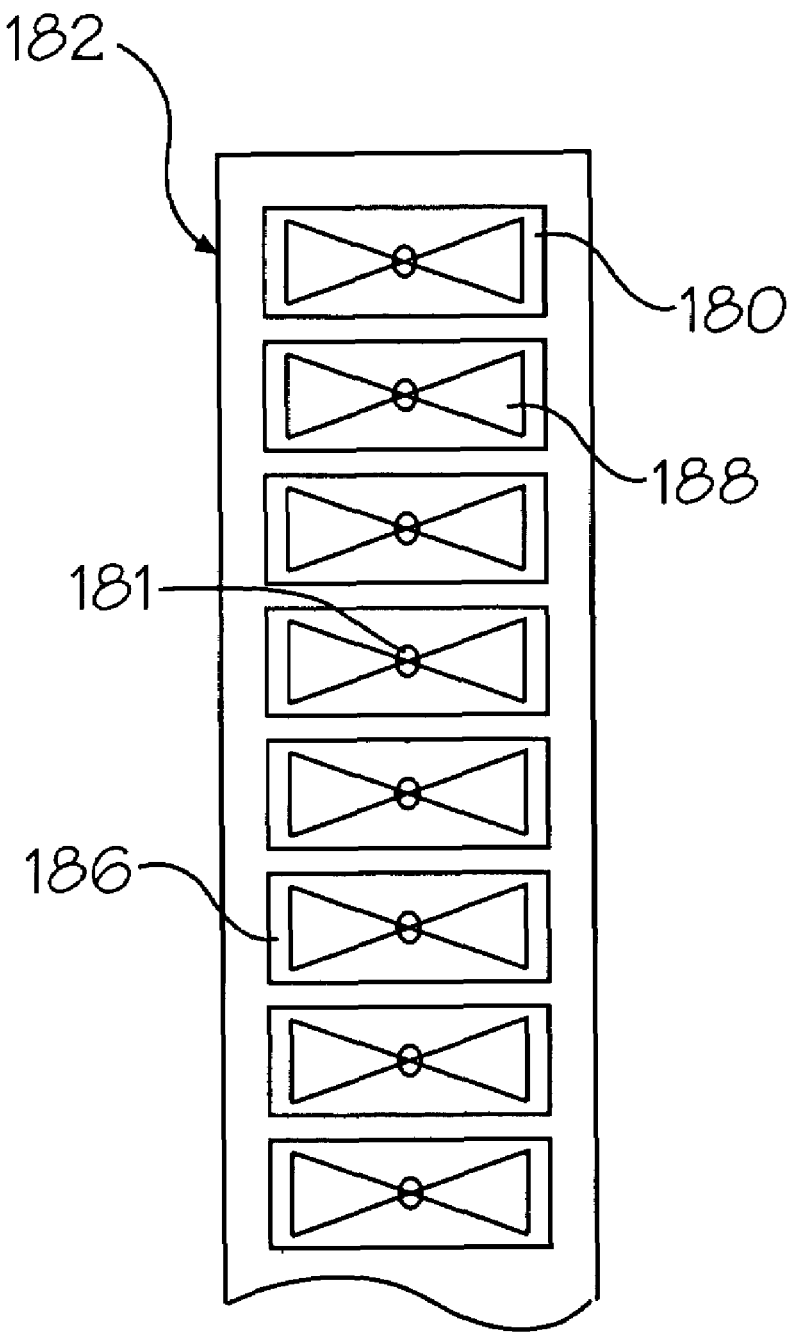
FIG. 4 is a top plan view showing multiple blank RFID transponders disposed on a web.

Referring now to FIG. 4, there is shown a top plan view of multiple blank RFID transponders 180 disposed on a web 182. RFID transponder 180 is assumed to be a UHF transponder with a bow-tie antenna 186. Disposed in the center of the antenna 186 is an RFID ASIC 184. It will be recognized that the type, operating frequency, dimensions, orientation, inter-device spacing, etc. may vary from application to application and that the invention is not considered limited to a particular RFID transponder 180 type, size, operating frequency, or packaging strategy.

Typical dimensions for RFID transponders 180 range from approximately 0.25 inches in width and approximately 1 inch in length to approximately 4×4 inches in size. RFID transponders 180 are often packaged on a web 182. When this packaging system is used with the programmer 100 (FIG. 1), the lead RFID transponder 180 must be threaded through the open end of air gap slot 104. This design may be acceptable in some applications but unacceptable in others.

Figure 5:
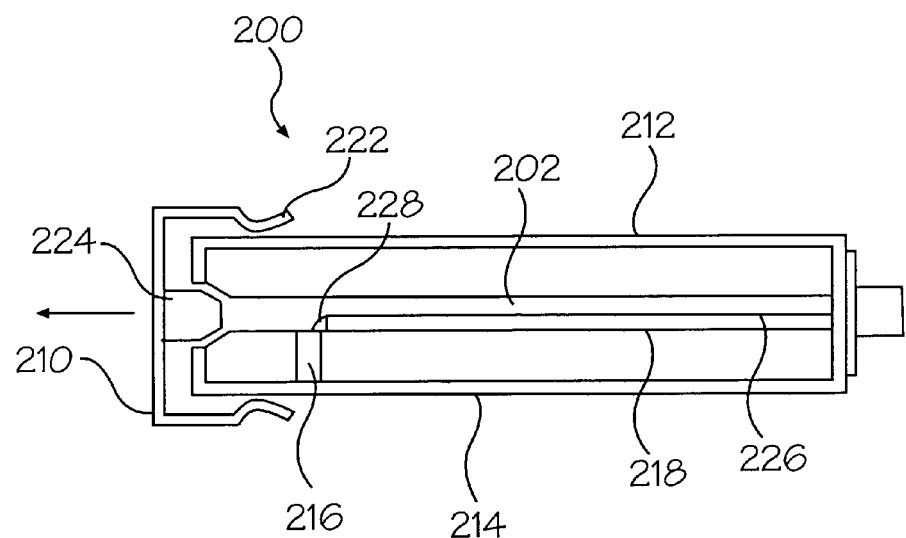
FIG. 5 is a side cross-sectional view of an alternate embodiment of the inventive programmer having an open-ended design.
Figure 6:
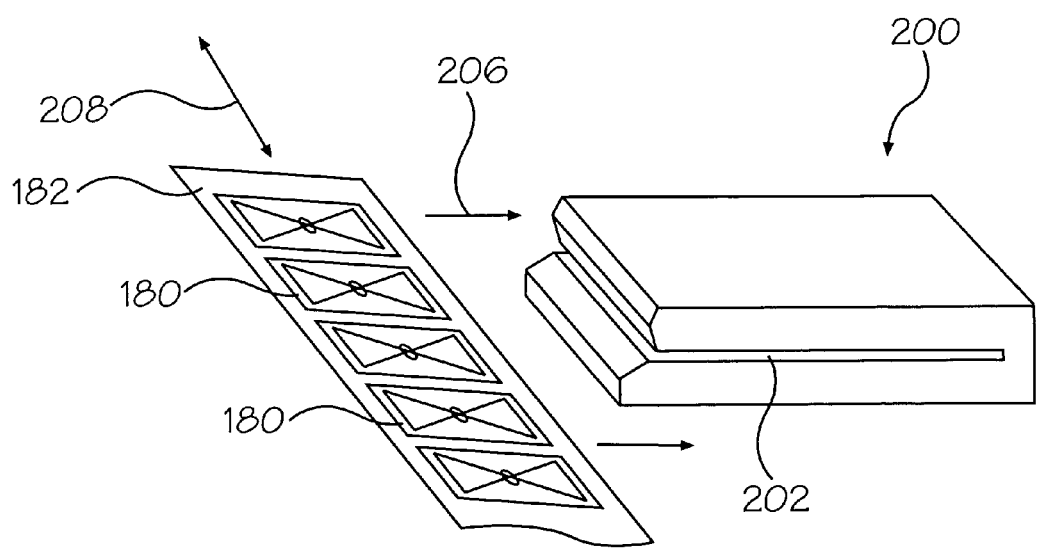
FIG. 6 is a perspective view of the programmer of FIG. 5.

Referring now to FIGS. 5 and 6, respective side cross-sectional and perspective views are shown of yet another embodiment of the inventive programmer 200 having an open-ended design. The programmer 200 allows easy threading of the transponder web 182 through the printer mechanism. The removable end cap 210 may be moved out of the way to allow threading the transponder web 182 into programmer 200. After threading, removable end cap 210 may then be replaced. Removable end cap 210 makes contact with the upper and lower halves 212, 214, respectively when the programmer 200 is ready for operation. A mechanical support structure 224 is affixed to an inside surface of removable end cap 210. The function of mechanical support structure 224 is to wedge between the upper and lower halves 212, 214 to ensure firm and consistent separation thereof.

FIG. 6 shows the programmer 200 with the removable end cap 210 removed and before the web 182 is inserted into the opening slot 202. With the removable end cap 210 moved out of the way, a web 182 carrying unprogrammed RFID transponders 180 can slide into the opening slot 202 of the programmer 200 in a direction indicated by arrow 206. Once the web 182 is inside the opening 202, the web 182 is allowed to move in a forward or reverse direction as indicated by arrow 208. Once the web 182 has been inserted into the opening 202, the removable cap 210 may be slid into place to close the opening 202, thereby retaining the web 182 therein.

The most important function of the removable cap 210 is to provide a good electrical connection between the ground planes formed by the top surface 212 and bottom surface 214 of the programmer 200. The top surface 212 and the bottom surface 214 (i.e., the ground planes) and the contact points 222 of the removable cap 210 may be plated with conductive metal, such as gold, tin, or chrome to ensure good electrical contact between the contact points 222 and the top and bottom surfaces 212, 214. In a programmer 200 design using a removable end cap 210, the placement of the terminating resistor 216 is also important. In the disclosed design of FIG. 5, the position of terminating resistor 216 is considered to be only one of the many possible placements and the invention is not considered limited to the exact placement indicated but rather covers any possible variation in placement.

The center conductor 226 for the strip transmission line is disposed within slot 202. Solder joint 228 connects center conductor 226 and the terminating resistor 216. In an alternate embodiment, terminating resistor 216 may be placed near removable end cap 224. In still other embodiments, the terminating resistor may be formed as part of the removable end cap, thereby moving the terminating resistor 216 out of the way and allowing easy transponder web 182 insertion. Once the transponder web 182 has been inserted into programmer 200, removable end cap 224 carrying terminating resistor 216 may be reinserted. It will be recognized that a wide variety of conductive metals, metallized polymers, or the like could be used to coat the removable cap 204 or top and bottom surfaces 212, 214. Consequently, the invention is not considered limited to the examples chosen for purposes of disclosure.

A terminating resistor 216 is embedded within the programmer 200. A resistor 216 terminates the strip transmission line formed by the central conductor 218. The terminus of the central conductor 218 is a connector 220 disposed at the distal end thereof and adapted to both receive programming commands and deliver backscattered data from an RFID transponder 180 being read within the programmer 200.

Figure 7A:
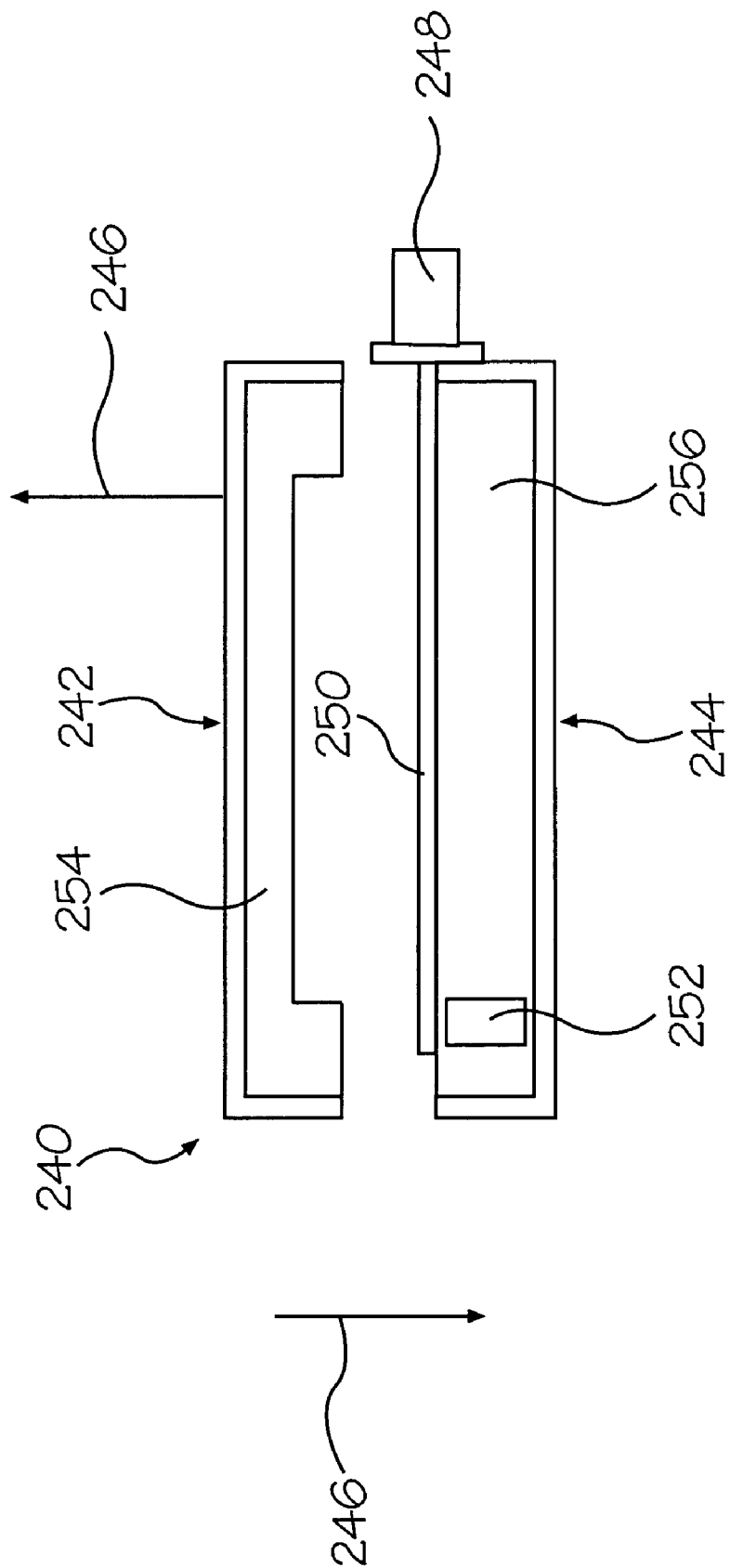
FIG. 7a is a cross-sectional view of another alternate embodiment of the inventive programmer.

FIG. 7a is a cross-sectional view of another possible embodiment of the inventive programmer, generally at reference number 240. The programmer 240 has an upper portion 242 and a lower portion 244 designed for separation along a direction indicated by arrow 246. Once the programmer 240 has been separated, a web (not shown) may be appropriately placed in the programmer 240 and the upper and lower portions 242, 244 may be rejoined. The programmer 240, like other embodiments described hereinabove, utilizes a strip transmission line having an RF connector 248, a central conductor 250, a terminating resistor 252, and dielectric materials 254, 256. It is assumed that the outer surfaces (upper and lower) function as ground planes to complete the strip transmission line. Once the programmer 240 is reassembled, the web (not shown) may move freely through the programmer 240.

Figure 7B:
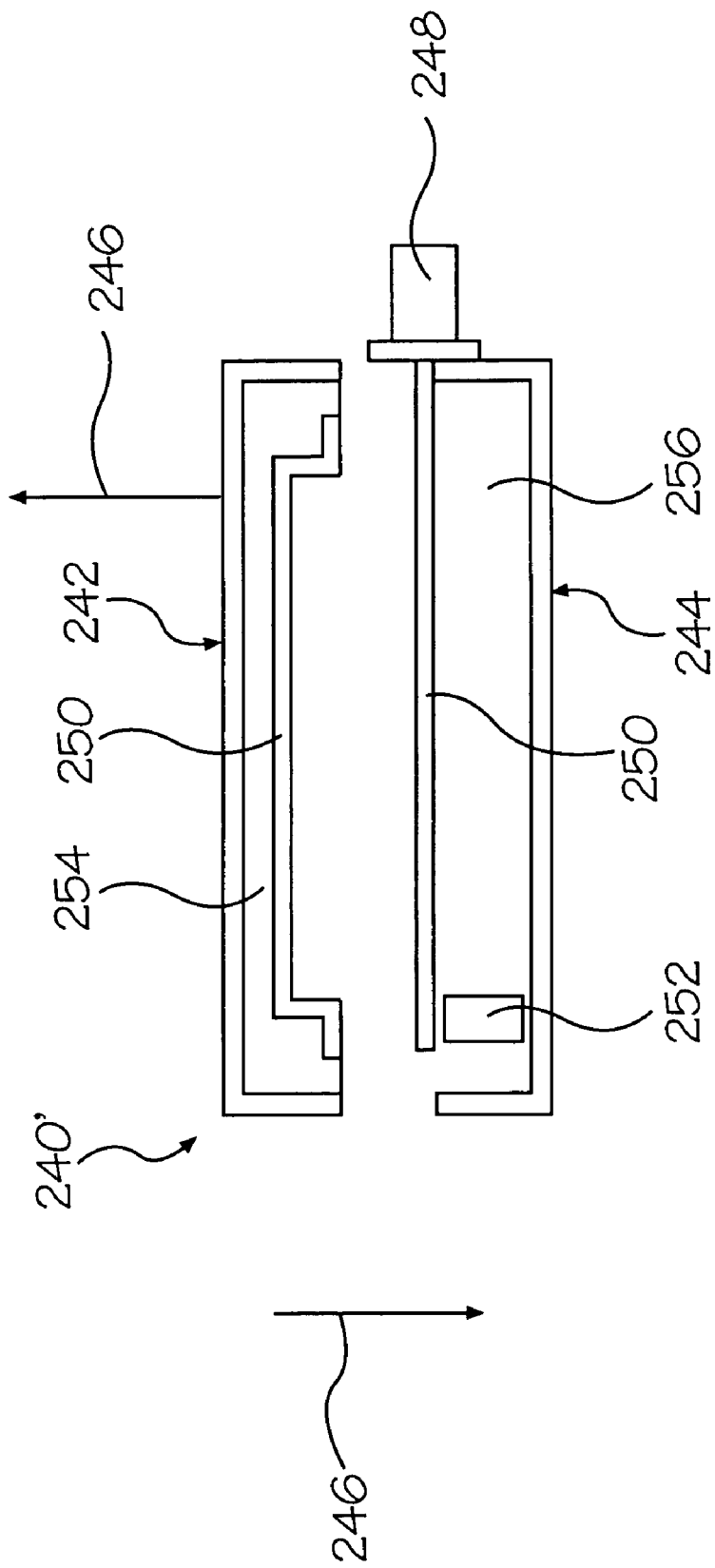
FIG. 7b is a cross-sectional view of still another alternate embodiment of the inventive programmer.

FIG. 7b is another variation of the design of programmer 240 as shown in FIG. 7a. In this alternate design, the center conductor 246 (FIG. 7a) of the strip transmission line is split into two pieces 250a, 250b. The upper portion 250b is bent into a U-shape to form a gap similar to that of gap 104 (FIG. 1) for accepting web 182 (FIG. 4). When upper and lower portions 242, 244, respectively, of programmer 240' are clamped together, center conductor portions 250a and 250b make firm contact against each other thereby forming a center gap to allow the transponder to pass therebetween. This design further ensures that the field established within the programming device 240' is evenly distributed across the width of the gap.

Figure 8:
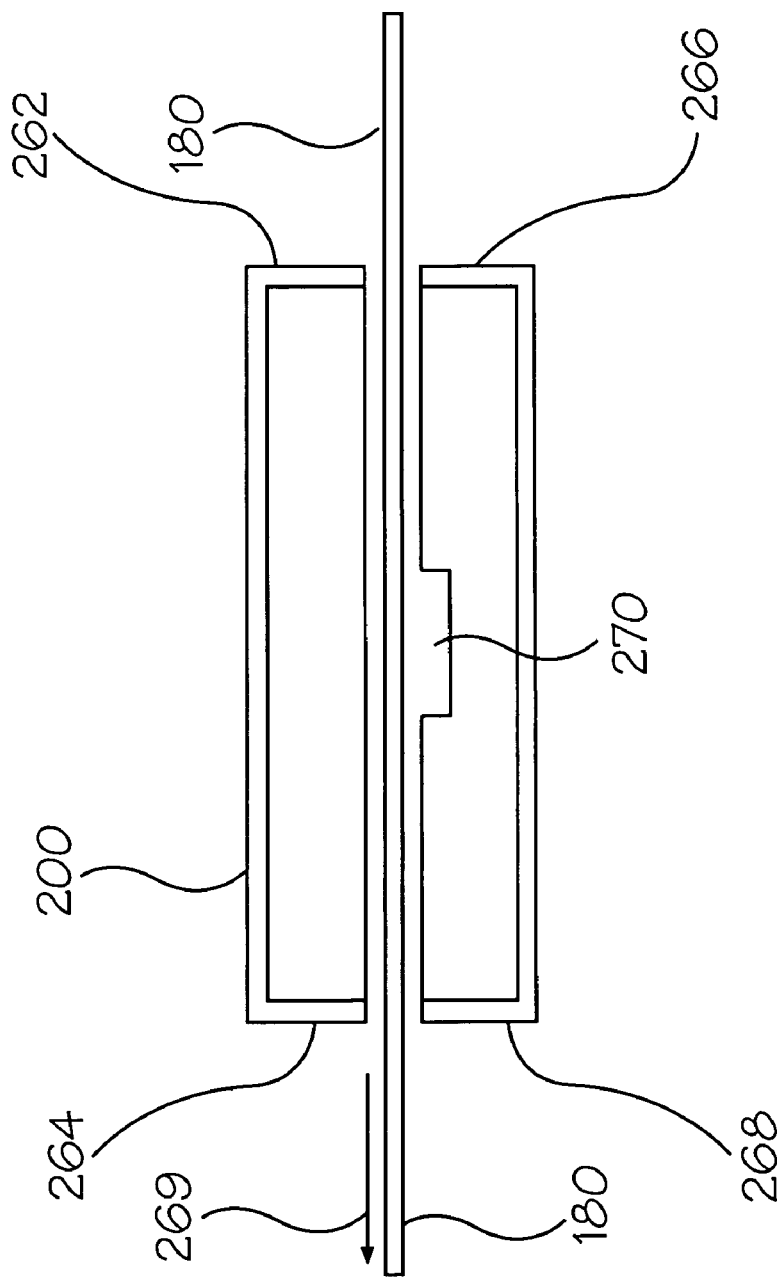
FIG. 8 is a cross-sectional view of the programmer of FIG. 5 with added wraparound lips.

FIG. 8 is a cross-sectional view of a programmer 200', which is the programmer 200 of FIG. 5 modified by the addition of wraparound lips 260, 262, 264, 268. The web 182 carrying the blank RFID transponders 180 enters the programmer 200' through the gap formed between wraparound lips 260 and 262. Once the RFID transponders 180 are programmed, the web 182 exits the programmer 200' through the gap formed by wraparound lips 264 and 266 in the direction indicated by arrow 269. A central conductor 270 forms the heart of a strip transmission line. The physical distance between central conductor 270 and 180 determines the loading of the transmission line by web 180. Larger distances tend to maintain a constant characteristic impedance but lessen the field strength. On the other hand, smaller distances result in a greater impact on the characteristic impedance but increase the field strength.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A programming device for RFID transponders disposed on a web comprising:
 a) a strip transmission line comprising:
 i) a central conductor having a top and a bottom surface;
 ii) a first dielectric layer having a top and a bottom surface substantially parallel to one another and having a predetermined first thickness, said bottom surface being disposed adjacent said top surface of said central conductor;
 iii) a second dielectric layer having a top and a bottom surface substantially parallel to one another and having a predetermined second thickness and a second dielectric constant, said top surface being disposed adjacent said bottom surface of said central conductor;

iv) at least one ground plane disposed proximate said top surface of said first dielectric layers and said bottom surface of said second dielectric layer, said strip transmission line having a characteristic impedance defined by at least one of the factors: said first thickness, said second thickness, said first dielectric constant, and said second dielectric constant;

v) a terminating resistor external to the housing, connected between the conductor and the at least one ground plane, wherein the terminating resistor is formed as part of a removable end cap that secures the web within the housing and electrically couples a portion of the housing below the web with a portion of the housing above the web, operatively connected between said central conductor and at least one of said at least one ground plane; and b) a housing substantially surrounding said strip transmission line having an opening disposed adjacent said central conductor adapted to receive an RFID transponder therein; whereby, upon application of an RF programming signal to said central conductor, an RF field is generated and a first RFID transponder inserted into said opening may be programmed thereby while said RF field is of insufficient intensity to program any other RFID transponders adjacent said first RFID transponder.

2. The programming device for RFID transponders as recited in claim 1, wherein said first RFID transponder and said adjacent RFID transponders are supported on a web.

3. The programming device for RFID transponders as recited in claim 2, wherein said strip transmission line comprises at least one of the configurations: linear, U-shaped, and meandering strip transmission lines.

4. The programming device for RFID transponders as recited in claim 3, wherein said opening comprises a substantially rectangular channel extending completely through said housing, disposed substantially perpendicular to said central conductor of said strip line and sized and adapted to receive said web.

5. The programming device for RFID transponders as recited in claim 4, wherein said housing comprises a housing separable in a plane substantially parallel to adjacent said central conductor.

6. The programming device for RFID transponders as recited in claim 5, further comprising a hinge along an edge of said housing and substantially in said plane of separation.

7. The programming device for RFID transponders as recited in claim 5, wherein said rectangular channel is exposed when said separable housing is separated whereby said web may be inserted into said rectangular channel.

8. The programming device for RFID transponders as recited in claim 3, wherein said opening comprises a slot extending completely along a face of said housing, said slot being sized and configured to receive said web therein.

9. The programming device for RFID transponders as recited in claim 8, wherein said slot further comprises an end cap removably attachable to said housing and extending substantially along the length of said slot.

10. The programming device for RFID transponders as recited in claim 9, wherein said end cap is electrically conductive and adapted, when in place, to create an electrical connection between a first portion of said housing adjacent an upper portion of said slot and a lower portion of said housing adjacent a lower portion of said slot.

11. A method for programming RFID transponders disposed on a web, said RFID transponders having a programming device in accordance with claim 1, the steps comprising:

a) providing said RFID programming device;

b) inserting a portion of said web carrying said any other RFID transponders into said opening; and c) supplying at least an RF programming signal to said transmission line; whereby an RFID transponder adjacent said transmission line is programmed by an RF field generated by said RF programming signal and surrounding said transmission line, said RF field being constrained by at least the configuration of said housing and the configuration of said transmission line such that said RF field is insufficient for programming any other RFID transponder on said web.

12. The method for programming RFID transponders disposed on a web as recited in claim 11, wherein said transmission line is one of the types: strip, and microstrip transmission line.

* * * * *